United States Patent [19]

Inuzuka

[11] Patent Number: 5,236,067
[45] Date of Patent: Aug. 17, 1993

[54] TREADING DEVICE FOR WHEELS

[76] Inventor: Masao Inuzuka, 2-3, Maeda 6-jyou 14-chome, Nishiku, Sapporo-shi, Hokkaido, Japan

[21] Appl. No.: 455,336
[22] PCT Filed: May 23, 1988
[86] PCT No.: PCT/JP88/00500
    § 371 Date: Feb. 16, 1990
    § 102(e) Date: Feb. 16, 1990
[87] PCT Pub. No.: WO88/10200
    PCT Pub. Date: Dec. 29, 1988

[30] Foreign Application Priority Data

Jun. 26, 1987 [JP] Japan .................. 62-158954

[51] Int. Cl.⁵ ............................................. B62D 57/00
[52] U.S. Cl. ........................................ 188/4 B; 180/16
[58] Field of Search ............................ 180/16; 188/4 B

[56] References Cited

U.S. PATENT DOCUMENTS 3,428,151 2/1969 Franklin .................... 188/4 B
4,732,239 3/1988 Hardmark et al. ............. 188/4 B

FOREIGN PATENT DOCUMENTS 0197902  2/1986  European Pat. Off. .
1162216  1/1964  Fed. Rep. of Germany ...... 188/4 B
2610048  9/1977  Fed. Rep. of Germany .
2820016 11/1979  Fed. Rep. of Germany .
 784469 12/1934  France .
2036889 12/1970  France .
 151202  4/1978  Japan .
 110674 11/1917  United Kingdom .

Primary Examiner—Robert J. Oberleitner
Assistant Examiner—Alfred Muratori
Attorney, Agent, or Firm—O'Keefe & Wilkinson

[57] ABSTRACT

An anti-skid mechanism for vehicles interposes a series of blades or fins between the wheels and the road surface. The fins are mounted upon a sprocket chain or endless belt which rotates about a pair of sprocket wheels with straight section of the sprocket chain aligned near the contact point of the tire with the road. The fins are consecutively laid upon and removed from the road surface in a straight line between the wheel and the road surface. The flat sprocket chain and its mounting upon the sprocket wheels provides a high degree of stability of movement of the blades which in conjunction with the straight orientation of the chain or belt and attached blades under the wheel maximizes the static coefficient of friction between the wheel and the road.

7 Claims, 2 Drawing Sheets

TREADING DEVICE FOR WHEELS

TECHNICAL FIELD

The present invention relates to a device for varying, at the discretion of the operator, the friction coefficient and the contact pressure between the tread of the wheels and the road surfaces by inserting fins of varying characteristics, or more in particular to a treading device which is simple, light and small, yet durable.

BACKGROUND ART

A means has been widely used to vary the friction coefficient and contact pressure of a wheel by interposing an anti-skid deterrent between the wheel and the road surface. For this purpose various anti-skid deterrents and devices are known. For example, in order to prevent skidding on frozen roads, sand and caterpillar tread devices or caterpillars have been commonly used.

The drawback of sand strewn on frozen roads for skid prevention is that it can be used only in limited areas because of the amount needed and the cleanup required afterwards.

Caterpillars are used for military tanks, snow mobiles and construction machines. However, caterpillars are not only difficult to attach and remove; but are heavy themselves.

In order to overcome these drawbacks, studded tires or anti-skid chains have been used on frozen roads. However the present studs and chains are still difficult to attach and remove, through not as difficult as caterpillars. Consequently many drivers leave them on continuously even when they are unnecessary on normal roads. Therefore their use results in damaged roads, giving rise to wheel dust pollution and also damaging the studs or the chains. In addition, their use is accompanied by other problems like fuel waste and unpleasant driving.

In order to solve the above mentioned problems, various inventions have been devised to make it possible to interpose an anti-skid deterrent only when necessary. For example, in a specification of JP. A, 54-151202 (GORAN TORNEBACK) or British patent 110,674 (HAROLD THORNE), relevant devices are shown which use a bunch of short chains consecutively inserted under a tire or trodden as anti-skid deterrents. In these devices chains rotated about a center are imposed under a wheel by the centrifugal force due to the gyration of the chains. Therefore they can work when going up a slope or starting, and can be used only when necessary. However, one drawback is that the chains cannot be imposed under a wheel when braking because of the absence of gyration.

In order to solve this shortcoming, German patent—DE, B, 1162216 (HANNS SCHNITZLER) is known to work when braking. In this specification a treading device with elastic anti-skid blades are attached to a gyrating boss. When the gyration centers of the boss and the wheel are at the appropriate positions with respect to the advancing direction of the wheel, this circular motion device enables the treading or imposition of the elastic anti-skid blades under the wheels when accelerating as well as braking. Such skid prevention function can be enhanced when studs are attached to the anti-skid blade.

However, the devices based on the circular motion as shown in the above-mentioned specifications have three serious faults which are interrelated to one another. Therefore none of these means have proven to be practical. These faults are as follows;

A. Inability to continue a smooth treading of anti-skid blades.
B. Inability to make both the anti-skid blades and the device strong and durable.
C. Difficulty in reducing the size of the device.

The main reason is the locus difference on the road between the tread of the tire and the blade of the anti-skid device—the former along a linear line with no lateral component and the latter having a quasicycloid resultant between the gyration of the blade and the vehicle motion. The moving length of a blade under the tread is shorter than the length of the tread. Therefore the effects of the locus difference seem insignificant.

However, experiments have shown the enormous effects of the difference. In order to discuss the motion in detail, the tire tread on which the anti-skid blade moves can be divided into two parts—1) the half between the tread front and the center and 2) the half between the center and the tread tail. In the first half, the trodden part of the blade becomes wider toward the connected end with the blade rotating. In the second half, the blade begins to be subjected to tension, since the trodden position or portion of the blade under the tire tread recedes from the rotation center. The greater the lateral motion component of the blade motion in the short radius circle, the stronger the tension upon the blade. The trodden part of the blade caught or compressed between the tire tread and the road surface stays at a fixed position on the road, while the other end connected to the center boss advances. The anti-skid blades are subjected not only to the above-mentioned tension but to twisting. The combination of the tension and the twisting will make the blades vulnerable to stress damage. Besides, as the trodden blade rotates and passes by or through the tread tail, the blade is released suddenly from the previous tension. Consequently, the repetition of this action will cause vibration which could be the cause of malfunctions.

On the other hand, when the radius of the circular motion of the blades is increased in order to reduce the locus difference, the blades must be stiffer to facilitate continuous gyration. The enlarged size and the stiffer blade make buffering or shock absorption more difficult. Consequently obstacles on a road can more easily damage the enlarged device. So it has not been possible to make a practical model.

If the supporting structure or main holding mechanism is strengthened so as to avoid the difficulties due to vibration, the device becomes vulnerable to malfunction due to lack of any shock absorbing or buffering function.

Furthermore, another difficulty of the circular motion of the rotating device is that the holding arm is not always stable, since in such position the holding arm can be connected only to a portion of such device near the gyration center.

Furthermore, the rotating anti-skid blades of the prior art have another fault. It has been proved in experiments that they prevent smooth operation or running of wheels of the vehicle; since, consuming energy, the action that deforms, twists and damages by the anti-skid blades interferes with the smooth rotation of the wheels.

Another point is that, when studs are installed in a blade to increase the friction coefficient, they are jarred or jerked by the blade. Therefore one difficulty or fault is not only that the studs and the peripheries of studs in a blade are subjected to excessive damage, but that the lateral motion of the studs and the blades make the coefficient of friction a dynamic one which is less than a statical one.

The objective of the present invention is to provide a treading device for wheels which is light, small, and strong to obviate the above mentioned faults, and yet provide smooth driving.

DISCLOSURE OF INVENTION

The present invention comprises a combination between an endless belt-like member provided with many flexible fins extending from the outside and a retainer which combination is positioned so that the revolving plane of the belt-like member is at an angle to the plane of wheel rotation of a wheeled vehicle. The retainer retains the revolving belt-like member together with the rotors in order to enable the flexible fins to proceed in a straight line when inserted under the wheel or tire tread of the vehicle. The fins and the belt-like member make orbits of a specific shape along the corresponding side of the retainer. Accordingly the loci of the wheel and fins can coincide under the tread. Each fin stands still temporarily while on the road surface and is subjected to little tension. Therefore the present invention constitutes a treading device for wheels which can interpose smoothly and continuously each fin under the tread in order to vary the contact conditions of the tire tread with the road surface at the discretion of the operator.

Furthermore the device is particularly effective for preventing skidding on a frozen road as a result of the maintenance of a statical friction coefficient due to the temporary repose of each fin on the road surface.

In addition, the present invention enables one to install more than two connecting means, such as holding arms, anywhere on or in an area within a revolving orbit of the belt-like member without hindering the motion of such belt-like members. Accordingly the device becomes stable in positioning, reducing the weight and the size of components necessary for shock absorption or buffering and positioning.

EFFECTS OF INVENTION

The present invention makes it possible to quickly alter the friction coefficients and contact conditions of wheels in accordance with road conditions, although it is a relatively simple mechanism. The on-off operation of the device is very simple, so that, when applied to skid prevention in winter, the use can be limited only to operation on a frozen road. Therefore effective studs can be used on a vehicle, even though harmful on ice free roads. Accordingly the present problems of studded tires and chains such as giving rise to wheel dust, noise, road damage and accidents due to the metal slip on normal roads can be solved. In addition, this invention is effective to greatly reduce other problems such as the fuel waste and unpleasant driving on ice free roads in winter.

Furthermore, the application can be broadened by making use of the ability to vary the contact pressure with specifically designed fins. For example, it can be used with thick rubber fins for temporary protection of the road pavement not only for caterpillar vehicles such as tanks and buildozers but for movement of vehicles having steel wheels. In addition, it can also be used with enlarged and hard fins to reduce the contact pressure on muddy fields or the beach.

When various combinations of specific belts and the attached fins are prepared the driving capacity of wheels can be enhanced with the present invention. This applies to sports and driving in the wilderness.

In these drawings;

1 is a belt-like member (a belt or an endless chain), 2 is a fin, 3 is a rotor or a sprocket, 4 is a retainer, 5 is road surface, 6 is a stud, 7 is a wheel, 8 is a shock absorbing or buffering system, 9 is a holding or support arm.

BEST MODE FOR CARRYING OUT THE INVENTION

The present invention will be described in detail below with reference to the drawings.

Figure 1:
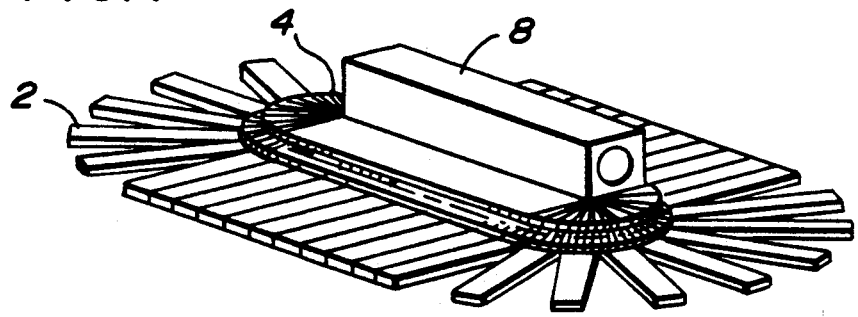
FIG. 1 is a perspective view of an example of the present invention.
Figure 2:
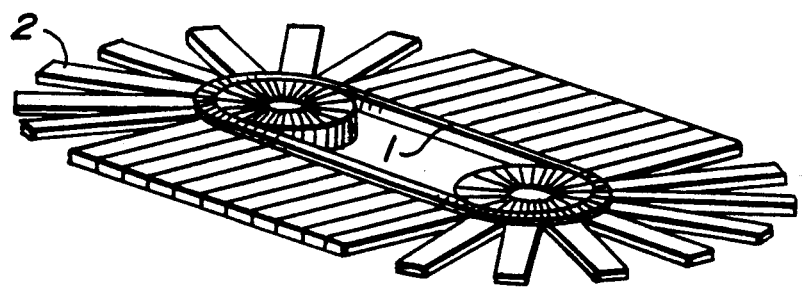
FIG. 2 is a perspective view of components of the example of FIG. 1 from which the retainer 4 has been removed.
Figure 3:
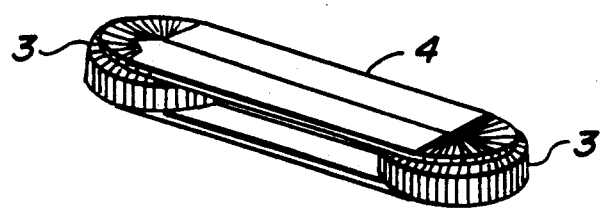
FIG. 3 is a perspective view showing two rotors 3 and the retainer 4.
Figure 4:
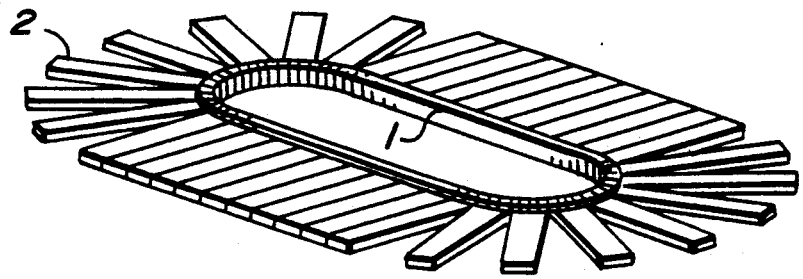
FIG. 4 is a perspective view of a belt-like member 1 upon which fins 2 are installed.

FIG. 1 is a perspective view of a practical example of a treading device in which a belt or belt-like member 1, to which fins 2 are attached (as shown in FIG. 4), is retained with two rotors 3 (as shown in FIG. 2). The rotors are made or designed to rotate freely and are retained in the retainer 4 (as shown in FIG. 3). The retainer is held at the appropriate position with the holding arm and the shock absorbing or buffering system 8.

In the present invention, either a chain of steel or other metal or a belt of rubber or plastics can be used as the belt-like member.

Figure 5:
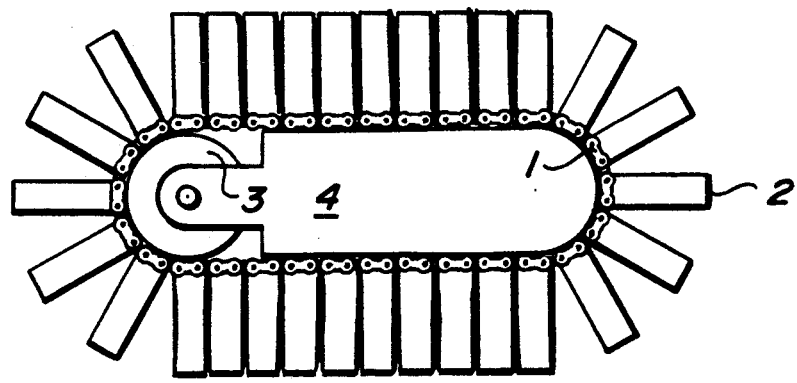
FIG. 5 is a plan view of an example using a sliding mechanism and a chain or sprocket chain for a belt-like member.

In the present invention, sprockets of metal or resin are used as rotors 3 which rotate the belt 1. The belt or belt-like member 1 can be guided by a sliding mechanism along the retainer 4 as in a conventional chain saw (as shown in FIG. 5).

In the present invention, the fins 2 are trodden under the vehicle tire while moving in a straight line along the lower edge of the retainer 4. Therefore they rest temporarily on the road surface under the tread.

Figure 6:
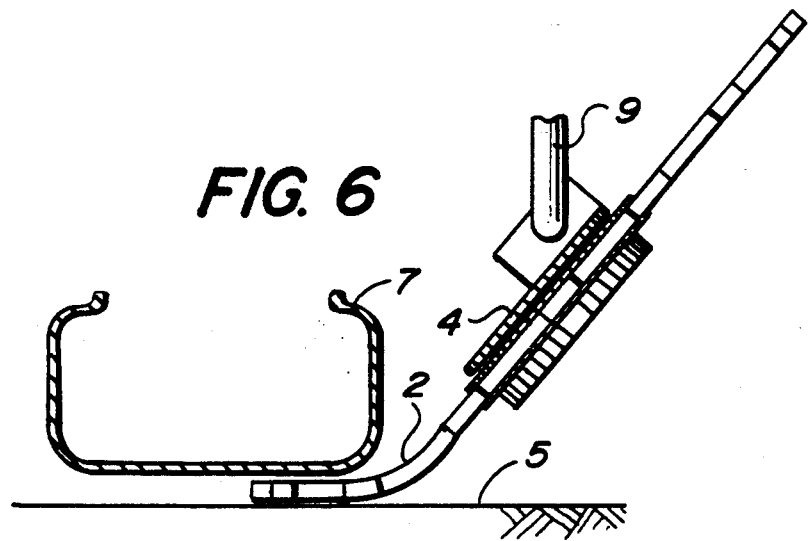
FIG. 6 is a sectional view when the example of the device shown in other figures is in use, in which the rubber wheel 7 of a vehicle treads on a fin 2.

FIG. 6 is a sectional view of the device in use wherein a wheel 7 of rubber tire is treading on a fin 2. The fin 2 trodden under wheel 7 is bent, while the fin is straightened after being trodden or emerging from under the tire of the vehicle.

Figure 7:
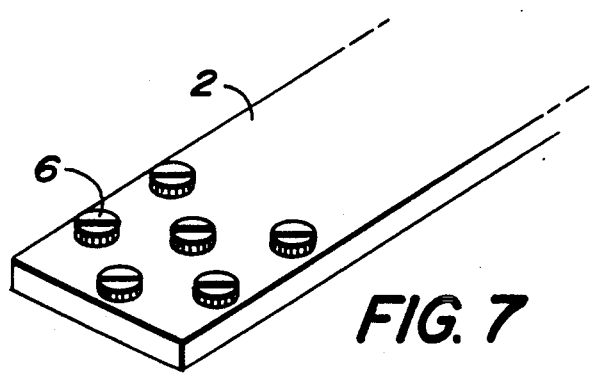
FIG. 7 is a perspective view of the studs 6 in a fin 2 of an example.

FIG. 7 is a perspective showing a detail of studs 6 installed on the tip of a fin 2.

INDUSTRIAL APPLICABILITY

The treading device for wheels of the present invention is practical as a means to vary, at the discretion of the operator, the friction coefficients and contact pressure of the wheels of various vehicles. Especially when this is used for the tires of automobiles, it can enhance considerably the ability to prevent skidding on a frozen road.

I claim:

1. A treading device for vehicle wheels, comprising an endless belt-like member to which a plurality of flexible fins having a free end and a restrained end are connected at their restrained ends along an outer periphery of the belt-like member wherein such belt-like member is received by at least one reciprocally shaped rotatable support means plus a second reciprocally shaped support means which prevent twisting of the belt-like member about its longitudinal axis, said belt-like member having a revolving plane positioned at an acute angle to the plane of vehicle wheel rotation; such that the intersection of the two planes is approximately parallel to a proceeding direction the wheel and that the fins and the belt-like member make orbits; and that a part of the orbit of the belt-like member is linear and wherein the belt-like member is a sprocket chain and the rotatable support means are sprocket wheels.

2. A treading device for vehicle wheels according to claim 1 characterized in that each flexible fin has a stud of hard material on a tip of the fin.

3. A treading device for vehicle wheels according to claim 1, characterized in that a retainer retains a sprocket in which an endless sprocket chain used as the belt-like member is movably received.

4. An anti-skid device for vehicle wheels comprising:
    (a) a support means adjacent a wheel of a vehicle,
    (b) a pair of rotatably mounted sprocket means upon said support means,
    (c) each of said sprocket means being adapted for receipt and close support of an endless belt-like means mounted for movement about a semi-orbital path defined by portions of the circumferences of said pair of sprocket means and straight portions between said sprocket means, said sprocket means supporting and guiding said endless belt-type means from rotational movement about its longitudinal axis,
    (d) a plurality of flexible fin means attached to a top of said belt means contiguous to each other and having their major dimensions aligned with the belt means and with each other,
    (e) the support means being mounted such that the semi-orbital path of the belt-like means is at an acute angle with orbital motion of the circumference of the wheel, and
    (f) the path of a lower straight portion of the path of the belt-like member is parallel with the path of the wheel and adjacent to the intersection of the tread of a tire upon the wheel such that portions of the fins extending under the tread of the tire where it contacts a road surface are attached only to the straight portions of the belt-like member.

5. An anti-skid device for vehicle wheels in accordance with claim 4 additionally comprising studs in free ends of the fins which are inserted under the vehicle tire.

6. An anti-skid device for vehicle wheels in accordance with claim 5 wherein the belt-like means is a sprocket chain interengageable with the sprocket means.

7. A treading device for wheels having a plane of wheel rotation, said treading device having a plurality of fins which, in use, are sequentially positioned between the wheels and a road surface to prevent the wheels skidding on the surface, the device comprising an endless belt having a plane of rotation about rotatable support means to which belt the fins are connected and a retainer, the retainer being positioned so that the plane in which the belt rotates is at an acute angle to the plane of wheel rotation and the intersection of the two planes is approximately parallel to the direction of travel of the wheels, characterized in that the endless belt is a chain to which the fins are connected, and the retainer positions two freely rotatable sprockets about which the chain runs so that part of the locus of the chain motion is linear.

* * * * *